May 31, 1966 J. D. BENFIELD 3,253,441
PIPE BENDING TOOL
Filed Feb. 24, 1964 2 Sheets-Sheet 1
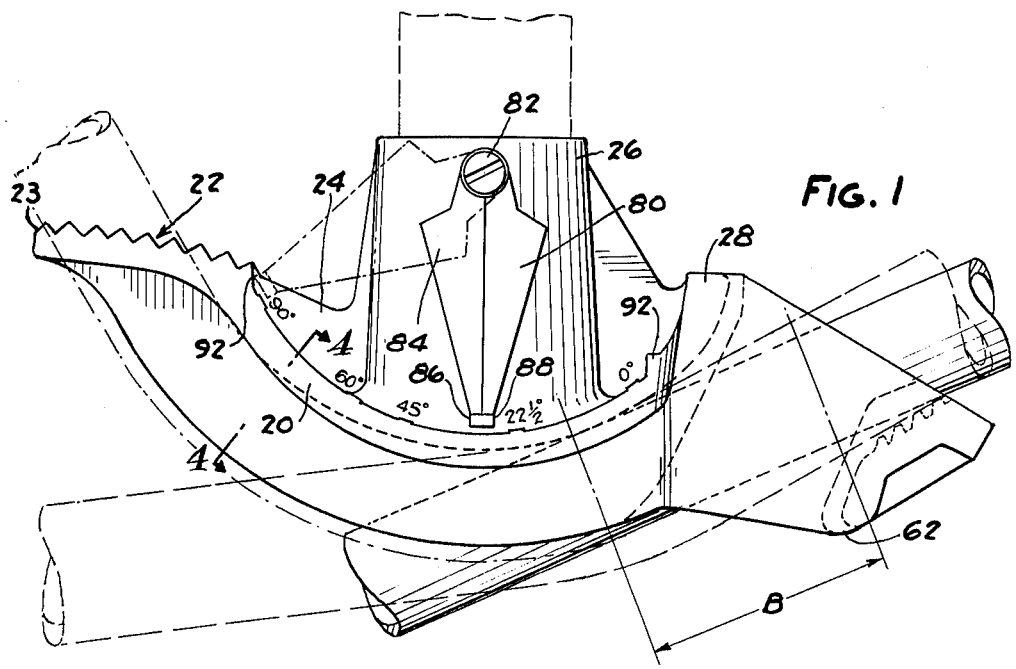
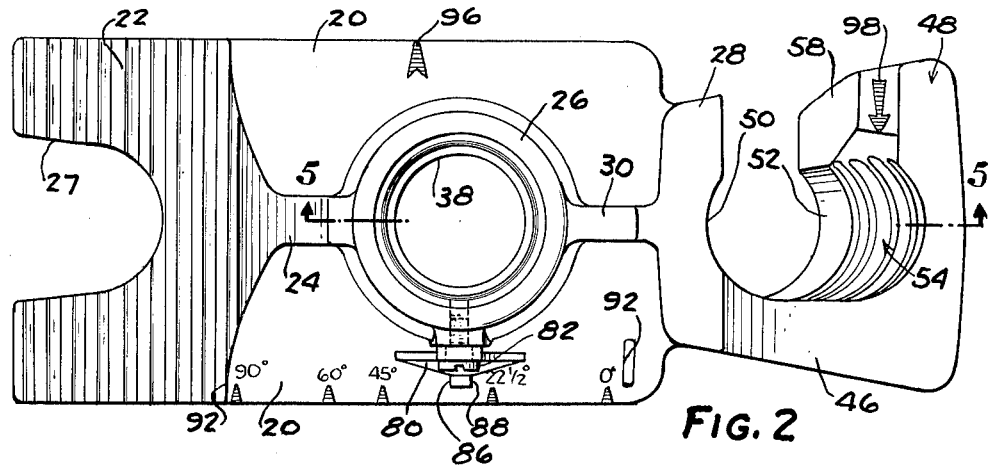
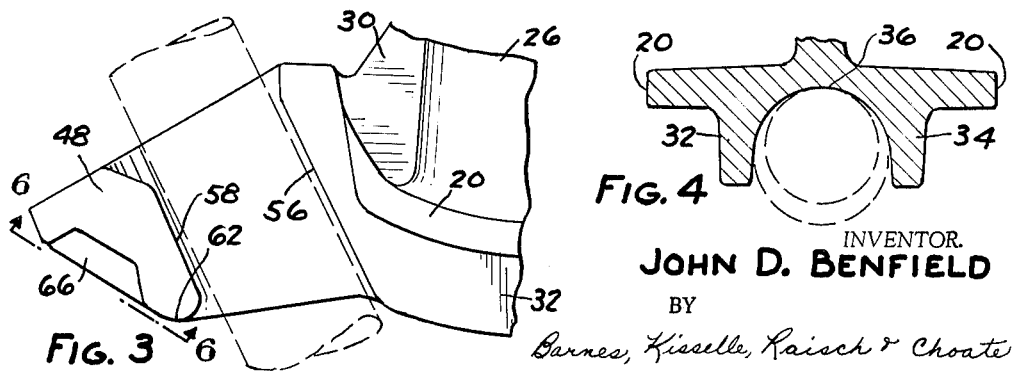
INVENTOR.
JOHN D. BENFIELD
BY
Barnes, Kisselle, Raisch & Choate
ATTORNEYS May 31, 1966 J. D. BENFIELD 3,253,441
PIPE BENDING TOOL
Filed Feb. 24, 1964 2 Sheets-Sheet 2
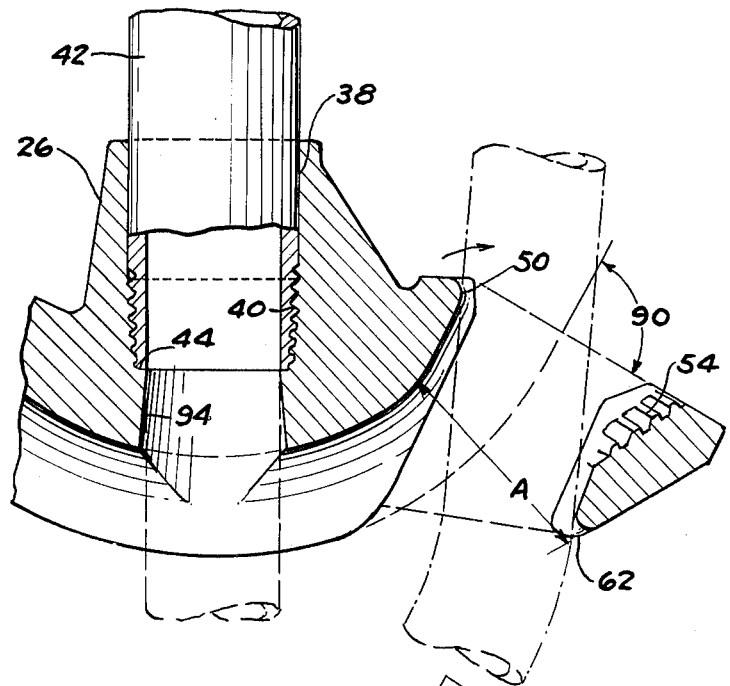
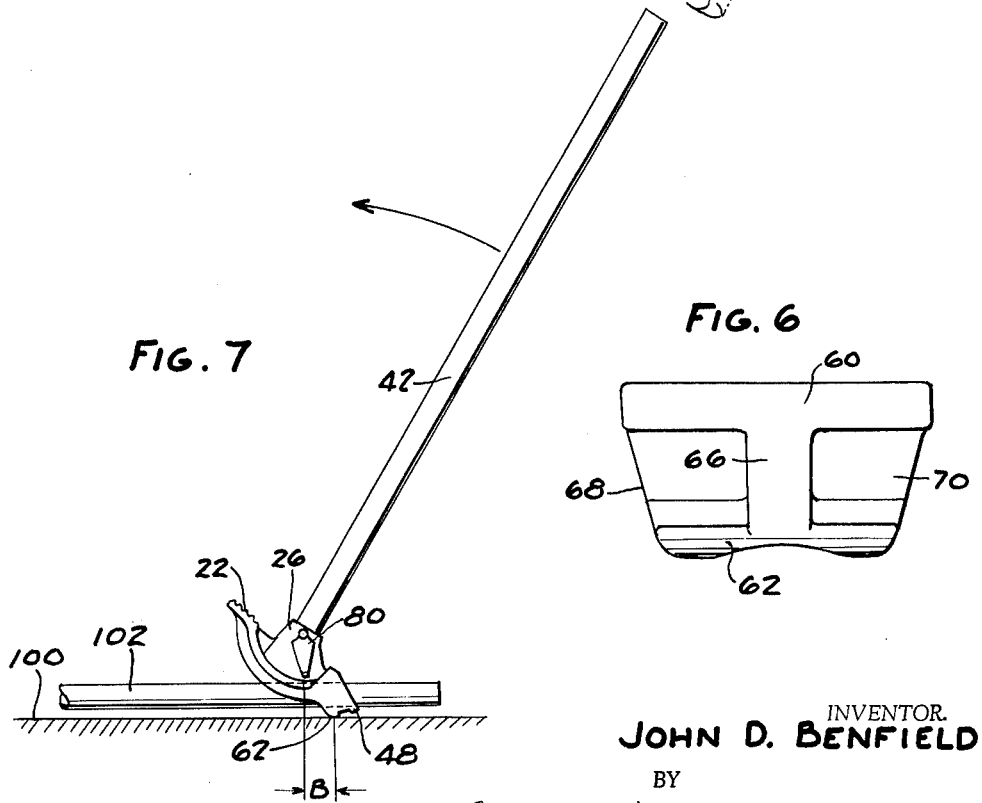
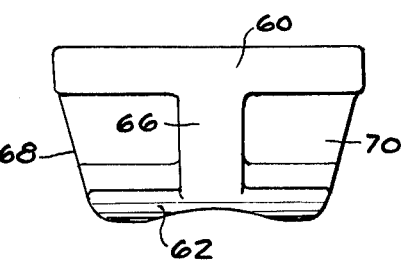
INVENTOR.
JOHN D. BENFIELD
BY
Barnes, Kisselle, Raisch & Choate
ATTORNEYS

United States Patent Office 3,253,441
Patented May 31, 1966

3,253,441
PIPE BENDING TOOL
John D. Benfield, 415 Brainard, Detroit, Mich. 48201
Filed Feb. 24, 1964, Ser. No. 346,725
5 Claims. (Cl. 72—31)

This invention relates to a pipe bending tool and more particularly to that type of tool known as a "hickey" which has a dictionary definition of "a device for bending pipe and conduit."

More particularly, the invention relates to that type of hickey which is used for bending what is called rigid or heavy wall metal pipe or conduit as distinguished from thin wall metallic tubing. In general, devices of this kind which are in common use resemble a conventional plumber's pipe T fitting which has its side wall cut away to receive the pipe to be bent. These fist-shaped devices are equipped with a long pipe handle for leverage. Then after taking several bites on the pipe and gradually shifting the tool in increments or small segments, the desired angle of bend can be obtained.

The present invention is an improved hickey which may be referred to as a "one-shot hickey" which can create any arc up to 90° of either short or long radius without the necessity of shifting the tool along the pipe to accomplish the result desired. The radius formed is dependent on the operator who can ease off on foot pressure and obtain a long radius or increase foot pressure to obtain a short radius bend. Since it is designed to make either a short or a long radius bend, this tool is not to be confused with fixed radius shoe benders used for bending thin wall tubing wherein the radius must conform with the fixed radius of the shoe of the bender. The present tool, however, may be shifted in several bites if the operator so chooses. It works equally well as a "one-shot" or multishot device.

It is an object of the present invention to provide a hickey for variable radius bending with a foot pedal to permit the operator to apply foot pressure. This extra leverage facilitates fabrication of the bend.

Another object is the provision of an extremely sturdy, compact tool which will stand the heavy bending stress to which it is subject.

Another object is the provision of an extended flat-backed hook or rocking shoulder which is cast at 90° to the plane of the bending sector which under foot pressure forces the operator to maintain the tool flat on the floor or bending surface thereby causing the whole assembly to move in a vertical plane perpendicular to that surface and which shoulder maintains floor contact for a sufficient portion of the bend to definitely establish the course or plane of the bend.

This flat-backed hook also provides stability and permits the tool and handle to stand upright on its own when not in use.

Another object of the invention is a construction wherein a free swinging automatic level indicator, usable for more than one pipe size, is provided for plumb bob action to provide a constant visual degree of angle indicator for controlling the degree of bend at all stages from 0° to 90°.

Another object of the invention is the provision of a hook so contoured that it will grip the conduit in any direction thereby permitting the pipe to be bent forward or pushed backwards to a limited degree to correct an overbend or to true up a bend that is leaning in an undesired plane.

Other objects and features of the invention relating to details of construction and operation will be apparent in the following description and claims.

Drawings accompany the disclosure and the various views thereof may be briefly described as follows:

FIGURE 1, a side view of the device showing engagement with a pipe.
FIGURE 2, a top view of the device.
FIGURE 3, a side view of one end of the device showing the pipe engaging portion.
FIGURE 4, a sectional view on line 4—4 of FIGURE 1.
FIGURE 5, a sectional view on line 5—5 of FIGURE 2.
FIGURE 6, an end view on line 6—6 of FIGURE 3.
FIGURE 7, an illustration of the device in position for the beginning of a bend.

Referring to the drawings:

In FIGURES 1 to 4, the hickey is shown composed of a pair of arcuate flanges 20 which blend into a split step portion 22 at the left-hand end as viewed in FIGURE 1, this step or treadle portion 22 terminating outwardly in a projection 23 and inwardly in a connecting web 24 which joins with a handle ferrule or socket 26. The step or treadle portion 22 has a central opening 27 large enough to receive the pipe being bent as the bending stroke nears completion. At the right-hand end of the device the flanges 20 merge into a transverse heavy wall portion 28 which is narrowed somewhat from the flange width and which also is connected to the central ferrule 26 by a web 30.

Viewed in cross-section, as shown in FIGURE 4, the flanges 20 have arcuate runners 32 and 34 extending downwardly and connected by a transverse arcuate surface 36. The ferrule portion 26 has a hole 38 which extends down through the entire device, this hole having a threaded portion 40 as shown in FIGURE 5 to receive the threaded end of a pipe handle 42 which seats against a small shoulder 44. At the right-hand end of the device, as viewed in FIGURES 1 and 2, the heavy wall portion 28 has an extension wall 46 which also constitutes an extension of one of the rails 32, this wall portion 46 curving around to form a heavy hook member 48 which terminates to leave a side opening through which a pipe may pass. This forms a pipe recess between wall 28 and hook portion 48 having a slight curved indented portion 50 on the inside. The top of wall 46 extends at about 90° to the tangent of the curve of the rails at the point of crossing. At the bottom of the hook portion 48 is another curved indented recess 52 which angles upwardly and outwardly in a gripping ribbed section 54 shown best in FIGURE 2. The opposed walls of the opening in the hook portion are formed by a continuation of the runner 32 extending upwardly in a narrow wall surface 56 on one side and a wall portion 58 at the end of the hook portion 48 on the other side.

The exterior surface of the hook portion 48, extending transversely of the unit as a whole, is shown in FIGURE 6 wherein a top rib 60 forms the upper-outer edge and a rounded heel portion 62 forms the lower surface, this portion being generated by a line moving at right angles to the general plane of the device including the handle. A short thick web 66 connects the top rib 60 with the outer wall portions 68 and 70 of the end hook. The surface 62 shown in FIGURE 6 is intended to rock squarely on a floor surface as shown in FIGURE 7 in order to position the device at right angles to the floor. This makes it possible to keep the hickey in a plane perpendicular to the floor during at least the initial portion of the bend and thus sets the proper course or plane of the bend which cannot be changed from then on by the operator except with extreme difficulty.

FIGURE 5 illustrates that surface 62 is spaced by distance A from the throat of the runners 32-34. With a runner radius of about 3", this distance A is preferably about 2". This is an important dimension as will be shown later. It is to be noted that the tool can be positioned stably resting on the runners and the surface 62 with the handle upward and over center. Thus, an operator will not have to lay it down each time it is used.

A visual indicator is also provided on the device on one side as shown in FIGURES 1 and 2. This indicator consists of a free swinging pivoted pointer element 80 which is supported on a screw 82 threaded into a wall of the ferrule 26. The screw is long enough that it may be used to lock the handle in socket 38. The pointer is shaped to flare at 84 so that it resembles a plum bob and weighted so that the center of gravity makes it swing freely. It will be noted that it has a squared pointer projection with straight spaced edges 86 and 88 which are used in connection with indicia marking on the flange portion 20 in such a way that the leading edge can be used for one-half inch pipe and the trailing edge for a three-quarter inch pipe. Small projections 92 at each end of the arc curve to stop the pointer from swinging beyond the arc in the event the tool is inverted for bending in mid air. Containing or confining the indicator keeps the pointer from becoming a nuisance to the operator. The markings can be positioned for bends of 22½°, 30°, 45°, 60° and 90°.

The handle 42 is preferably of a pipe size larger than the largest pipe the hickey is intended to bend. This blends with the lower portion 94 of the hole in the ferrule 26 so that a pipe can actually be projected into this hole from the bottom. This makes the device useful in straightening out small stub ends which project from a floor or a wall since these pipes may be projected up into the hole inside the pipe 42 and maneuvered into a relatively straight position in the event they have been accidentally knocked out of line. An arrow point 96 is provided on one of the flanges 20 to indicate what is referred to as the "back of the bend" so that in positioning the device on a pipe, the operator will know before he starts where the back of the bend will lie when the bend is completed.

An arrow marking 98 on the hook is used to align with markings on a pipe which is intended to rise over, for example, a certain obstruction. Charts are sometimes furnished to operators so that if they want to make an offset bend to go over, for example, a one foot riser, they can make two bends in the pipe at a certain spaced distance and accomplish the exact amount of rise desired. In doing this, the pipe must be marked at two points where the bends will start and this marking is used in co-operation with the arrow 98. The arrow is also used for calculating stub bends.

As shown in FIGURE 4, the pipe which is bent is not completely recessed in the opening between the runners 32–34. Thus, the hickey will always rest on the pipe once the bend has reached the point where pressure is applied to the supporting surface through the pipe. As shown in FIGURE 7, the supporting surface 100 is used to locate the bending hickey and the pipe 102 at this point is not in contact with the supporting surface. The hook portion 48 is supported on the surface 100 by the rocking shoulder portion. It is thus stabilized at right angles to the surface 100 and during the initial portion of the bend, the rocking shoulder 62 takes over, remaining in contact with supporting surface 100 for approximately 18° of the bend, thus supporting the hickey in a vertical upright position. After the bend has been started in its proper plane and as the pipe 102 is pressed on to the surface 100 as the bend continues, it is very difficult for an operator to change the course of the bend; it must remain "on course" or in its proper plane once it has been started.

During the bend, of course, the gripping portions 52 are grabbing the pipe and applying the pressure around the fulcrum portion which is the inside arcuate surface between the runners 32–34. If the pipe should accidentally be fabricated beyond the point desired, it can be retracted by pushing back on the handle until the hickey engages the pipe on the shallow recess 50, and at the surface 52 to allow pressure in reverse for removing a few degrees of bend. During the bending operation, of course, the entire weight of the operator can be placed on the split foot pedal portion 22 and this weight, plus the force introduced through the handle 42, allows a heavy wall pipe to be bent with relative ease. In each case, the indicator 80 can be brought to the point where it registers with the mark selected for the degree of bend the job requires. The plum bob indicator points to the degree of bend at every step of the way.

In a full bend stroke (FIGURE 1) it will be seen that the tube or pipe will recess into opening 27 in the treadle 22 as it wraps around the tool. This recess permits a more compact unit without sacrificing length for leverage on the treadle and also the wide split treadle facilitates the application of foot pressure from either side of the tool even at the end of the stroke.

Another important feature of the device is the location of the stabilizing surface 62 substantially outside the throat of the runners 32–34. This lifts one end of the pipe adjacent the tool off the supporting surface and permits a substantial angle of bend before that portion of the pipe or tube in contact with the tool hits the supporting surface to form the supporting fulcrum for the remainder of the stroke. It is preferable that the rocking heel 62 be spaced from the throat 36 by about twice the diameter of the largest pipe to be handled.

This rocker portion 62 is also extended out to the right as viewed in FIGURE 1 so that it is a substantial distance from the point of first contact or bend of the pipe. This distance is shown at "B" in FIGURE 1 which illustrates a full size tool for heavy wall pipe of ½" to ¾" in diameter. The actual O.D. of the pipe is, of course, greater than the specified sizes. The distance "B" is about 2" which is at least equal to 2 to 2½ times the diameter of the pipe to be bent. This outreach of the surface 62 allows the tool to swing through the approximately 18° arc before surface 62 leaves the supporting surface, thus assuring that the plane of the bend will be well established relative to the supporting surface. The runners 32–34 are preferably of such depth that a pipe being bent will project below them and rest on the supporting surface upon completion of the bend.

As previously pointed out, to facilitate use on two different sizes of pipe, the double-edged square pointer can be used and either edge 86 or 88 is sighted depending on which size of pipe is being worked on. It should be understood that the present device provides a fulcrum surface primarily as an impingement for the bend rather than as a forming surface. The pipe being fabricated does not come in contact with the arcuate groove 36 but bends out of contact in free space away from the groove in proportion to the extent of foot pressure applied.

The advantage of the present device, however, over the ordinary hickey now in use is that bends may be made in the customary manner or in "one-shot." The tool, therefore, permits variable bends to any degree from 1° to 360° circle or dependent upon the amount of foot pressure applied it may be used to bend short, medium or long radii in "one shot" without the necessity of shifting the tool along the pipe. With heavy foot pressure, a "one-shot" tight radius bend can be accomplished. With less foot pressure a more open radius can be achieved in a "one shot" move. A large radius bend can be made by shifting the tool after short bends.

It is to be noted that the pipe handle 42 is tightly held against turning by screw 82 which drives into the pipe socket. It is very important that this pipe be rigidly held to assure good control by the operator. The screw obviates any welding or brazing connection otherwise required. In addition, the tool has extreme strength and resistance to the stresses placed on it by reason of the double flange body rigidified by the spaced runners directly below the opposed flanges.

I claim:

1. A pipe bending tool for making variable bends on rigid and heavy wall pipe and conduit which comprises:
   (a) a body having an arcuate flange extending to each side and terminating at one end is a treadle surface,
   (b) means below said flange integral therewith and forming spaced runners on either side of an arcuate groove below said body,
   (c) a handle means on said body,
   (d) a pipe hook formed at one end of said groove on said body to embrace a pipe positioned on said groove,
   (e) rocker means comprising a surface generally parallel to said flange, said surface serving as a rest fulcrum to support said tool at rest and while being moved through a substantial degree of bend to control the plane of a bend, and a bend indicator comprising a swinging pointer pivoted on said handle means above said flange having a free end to move along one side of said flange, and indicia markings on said flange to cooperate with said free end to indicate the degree of arc through which said tool is moved on a supporting surface,
   (f) said pointer having spaced portions at the free end to register selectively with said indicia, each portion being related to a particular size of pipe to be bent.

2. A pipe bending tool for making variable bends on pipe, tubing and conduit which comprises:
   (a) a body to be hand levered having arcuate means generally segmental in shape forming a continuous, relatively shallow, arcuate, open guide groove surface in the bottom from one end of the segment to the other end designed to receive a portion only of the cross-sectional dimension of a pipe to be bent, the body being free of projection within the swing range of said body below said arcuate means except for
   (b) a pipe hook at one end of said body integral with one side of said body positioned to embrace a pipe in said groove and having an inwardly facing pipe contacting surface spaced radially outward from said arcuate means a distance substantially greater than the diameter of a pipe to be bent, and
   (c) a contact rocker means on the bottom of said hook presenting a stabilizing support surface extending transversely to the plane of the arcuate groove of said body and positioned outwardly of the throat of the groove of said arcuate means at one end of said groove a distance substantially equal to twice the diameter of the pipe to be bent to support said body in a cocked position in a plane of bend on a supporting surface when a pipe is positioned in said groove and hook,
   (d) said rocker means projecting materially outside the arc of said groove and spaced away from the midpoint of the arc of said groove to serve as a bend initiating, stabilizing fulcrum wherein a bend of approximately 18° can be made before the fulcrum load is transferred from said rocker means to the pipe in said groove and said means is lifted off the supporting surface.

3. A pipe bending tool for making variable radius bends in conduit, tubing and pipe which comprises:
   (a) a body portion generally segmental in shape having an arcuate base portion and provided with a continuous groove along said arcuate base portion from one end of said segment to the other end, said body terminating at one end of said groove in a work engaging hook and at the other end in a foot treadle surface,
   (b) a handle on said body extending radially of the arcuate base portion for shifting said body approximately around the center of said arcuate base portion,
   (c) the back surface of said hook being extended radially from said groove in said arcuate base portion materially beyond the radial projection of any pipe positionable in said groove in an offset portion terminating in a plane with a surface at 90° to the general plane of the body portion and contoured to serve as a bend initiating, stabilizing fulcrum to support the tool at rest and being radially offset from the throat of the groove in said arcuate base to a degree substantially equal to twice the diameter of a pipe to be bent to maintain floor contact during a substantial degree of bend so as to set the course of the bend in a plane vertical to the working surface and permit an operator to place his entire weight on the foot treadle without losing balance.

4. A pipe bending tool for making variable radius bends in conduit, tubing and pipe which comprises:
   (a) a body portion having an arcuate base portion and provided with a groove along said arcuate base portion, said body terminating at one end of said groove in a treadle surface and at the other end of said groove in a work engaging hook,
   (b) said body having an integral side flange to form a flat curved rail following the curve of the base portion and extending to one side of the body and terminating at said treadle at one end and at said pipe hook at the other end,
   (c) a pipe handle socket on said body extending radially of said arcuate base portion for mounting a handle in the general plane of the body portion,
   (d) a swivel pointer pivoted on said handle socket above said side flange having a free end to swing in proximity to the flat curved rail,
   (e) indicator indicia on said rail to designate a degree of bend,
   (f) the back surface of said hook being extended radially from said groove in said arcuate base portion materially beyond the radial projection of any pipe positionable in said groove in an offset portion terminating in a plane with a surface at 90° to the general plane of the body portion and contoured to serve as a bend initiating fulcrum to support the tool at rest and being radially offset from said groove to a degree to maintain floor contact during a substantial degree of bend so as to set the course of the bend in a plane vertical to the working surface.

5. A pipe bending tool for making variable radius bends in conduit, tubing and pipe which comprises:
   (a) a body portion having an arcuate base portion and provided with a groove along said arcuate base portion, said body terminating at one end of said groove in a treadle surface and at the other end of said groove in a work engaging hook,
   (b) said body having an integral side flange to form a flat curved rail following the curve of the base portion and extending to one side of the body and terminating at said treadle at one end and at said pipe hook at the other end,
   (c) a pipe handle socket on said body extending radially of said arcuate base portion for mounting a handle in the general plane of the body portion,
   (d) a swivel pointer pivoted on said handle socket at a point spaced from said side flange having a free end to swing in proximity to the flat curved rail, and
   (e) indicator indicia on said rail to designate a degree of bend, said pointer having laterally spaced portions at the free end to register selectively with said indicia, each spaced portion being related to a particular size of pipe to be bent,
   (f) the back surface of said hook being extended radially from said groove in said arcuate base portion materially beyond the radial projection of any pipe positionable in said groove in an offset portion terminating in a plane with a surface at 90° to the general plane of the body portion and contoured to serve as a bend initiating fulcrum to support the tool at rest and being radially offset from said groove to a degree to maintain floor contact during a substantial degree of bend so as to set the course of the bend in a plane vertical to the working surface.

References Cited by the Examiner

UNITED STATES PATENTS

| | | |
|---|---|---|
| 909,046 | 1/1909 | Woolson _____ 33—212 X |
| 1,613,776 | 1/1927 | Will. |
| 1,627,034 | 5/1927 | Henderson. |
| 1,672,068 | 6/1928 | Laing. |
| 1,754,317 | 4/1930 | Henderson. |
| 2,531,077 | 11/1950 | Mullin _____ 33—207 X |
| 2,817,986 | 12/1957 | Benfield. |
| 2,932,225 | 4/1960 | Gardner. |
| 3,028,679 | 4/1962 | Christy. |

WILLIAM FELDMAN, *Primary Examiner.*

MICHAEL BALAS, *Examiner.*

J. L. JONES, JR., *Assistant Examiner.*